(12) United States Patent
Li et al.

(10) Patent No.: US 6,597,147 B2
(45) Date of Patent: Jul. 22, 2003

(54) 1/8TH AND 1/16TH MICRO-STEPPING MOTOR DRIVE SOFTWARE ARCHITECTURE

(75) Inventors: Yanqing Li, Jersey City, NJ (US); Luu T. Pham, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 303 days.

(21) Appl. No.: 09/752,161

(22) Filed: Dec. 29, 2000

(65) Prior Publication Data

US 2002/0133262 A1 Sep. 19, 2002

(51) Int. Cl.⁷ .................................................. H02P 8/00
(52) U.S. Cl. ........................................................ 318/696
(58) Field of Search ................................. 318/685, 696, 318/254, 701

(56) References Cited

U.S. PATENT DOCUMENTS

| | | | | |
|---|---|---|---|---|
| 4,710,691 A | * | 12/1987 | Bergstrom et al. | 318/696 |
| 5,359,271 A | * | 10/1994 | Husher | 318/696 |
| 5,410,338 A | * | 4/1995 | Jadrich et al. | 347/264 |
| 5,640,075 A | * | 6/1997 | Brasseur et al. | 318/685 |
| 5,851,354 A | * | 12/1998 | Sakiyama et al. | 318/562 |
| 6,121,745 A | * | 9/2000 | Komm | 318/696 |
| 6,414,460 B1 | * | 7/2002 | Li et al. | 318/685 |

* cited by examiner

*Primary Examiner*—Bentsu Ro
(74) *Attorney, Agent, or Firm*—Brian A. Lemm; Angelo N. Chaclas; Charles R. Malandra, Jr.

(57) ABSTRACT

A method of controlling a microstepping motor is disclosed. Logic circuitry is initialized by a microcontroller. A logic sequence to determine a motor use profile, a system profile, and a program flow is performed, followed by a step sequence to establish the timing pattern of electrical impulses to be directed to an integrated circuit. A predetermined acceleration table is then accessed to implement acceleration. The logic circuit returns a delay constant from the acceleration table and places a set of data relative to the delay constant in one or more registers. A timing sequence is delivered to the integrated circuit that includes a set of interrupt service routines corresponding to a state of the motion profile. Each one of the interrupt service routines reloads a timer with a next delay constant and sends the next delay constant to the integrated circuit before updating the step count.

12 Claims, 15 Drawing Sheets

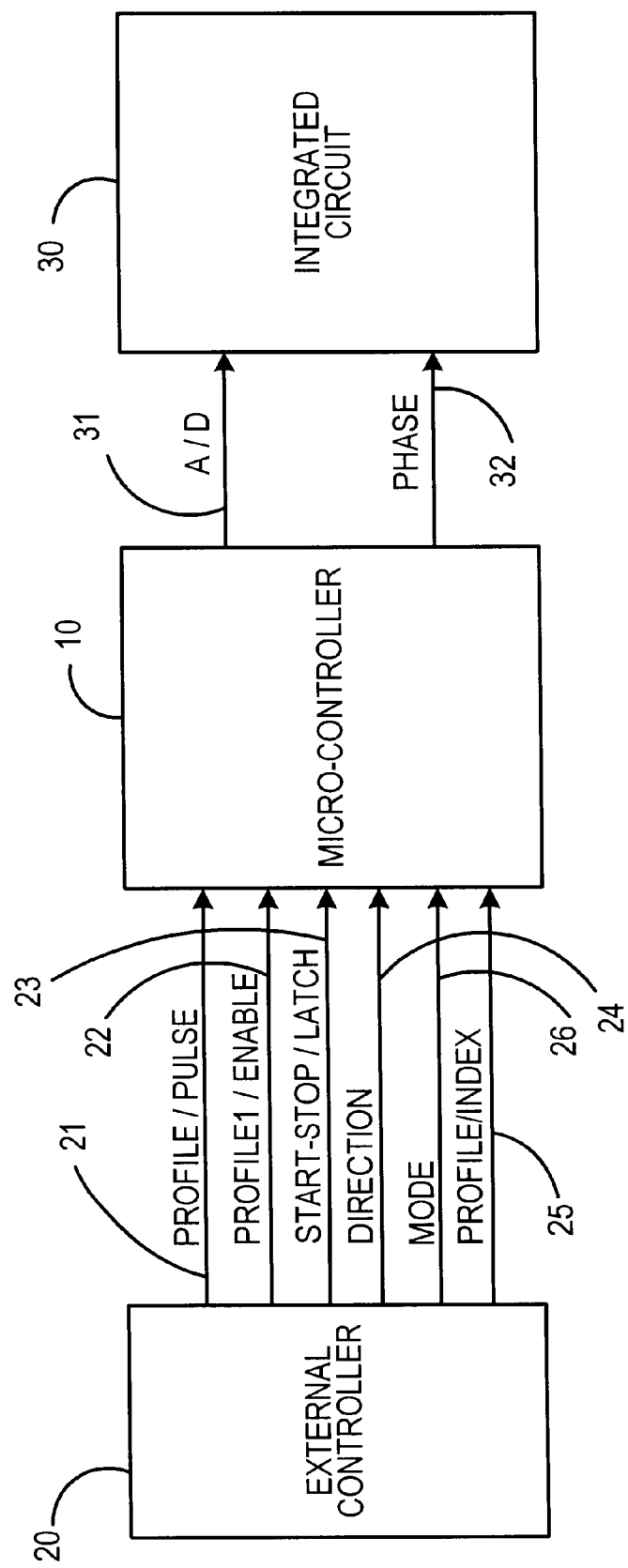

FIG.4D
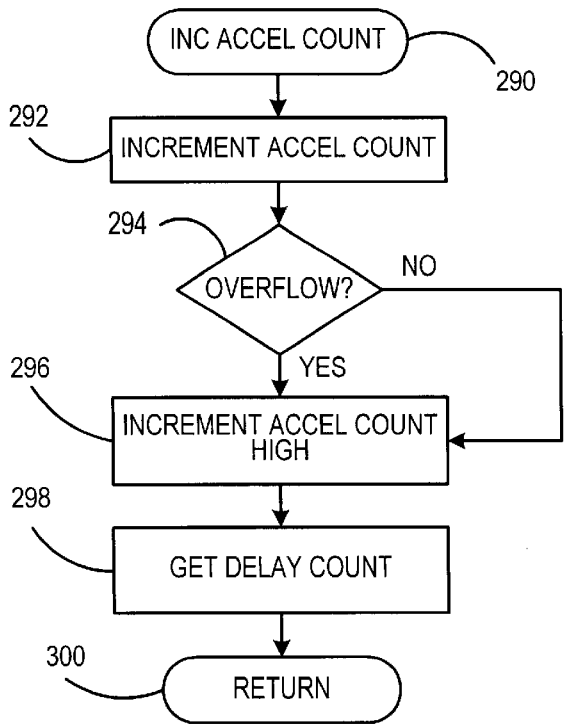
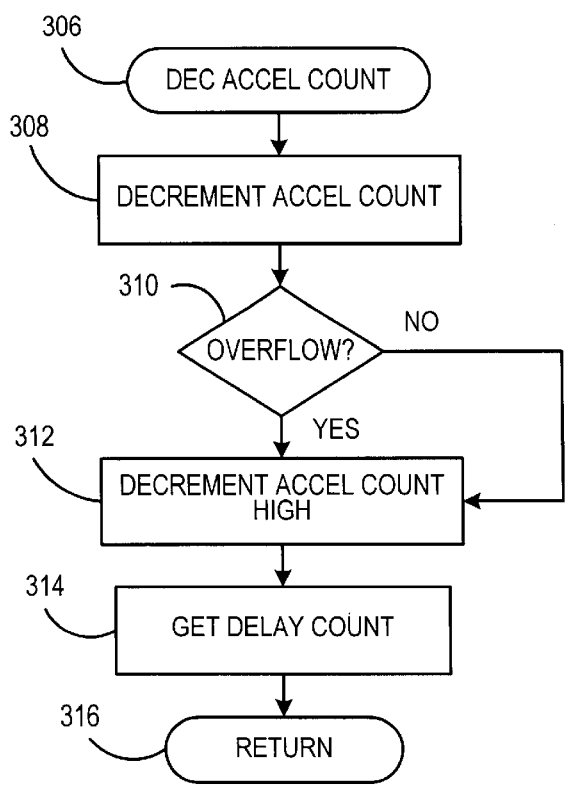

1/8TH AND 1/16TH MICRO-STEPPING MOTOR DRIVE SOFTWARE ARCHITECTURE

RELATED APPLICATIONS

Reference is made to application Ser. No. 09/752,174, now U.S. Pat. No. 6,414,460, entitled LOW COST $1/8^{th}$, $1/16^{th}$ MICRO-STEPPING MOTOR DRIVE SYSTEM, assigned to the assignee of this application and filed on Dec. 29, 2000.

FIELD OF THE INVENTION

The present invention relates generally to the field of motor drive systems utilized for driving office equipment and/or media feed systems; and, more specifically, to the field of micro-stepping motors and motor control torque resonance and acoustic noise reduction.

BACKGROUND OF THE INVENTION

Though there are motors of varied kind, shape and configuration within the equipment that serves our daily lives (everything from office equipment to cameras), they all serve the basic purpose of converting electrical energy into mechanical energy to drive a system component. One segment of this diverse motor population is represented by the group referred to as "stepper motors". These motors convert a series of electrical pulses into rotational movements of specific duration. The movement resulting from each pulse is consistent both in time and space, thus making stepper motors an ideal means for positioning objects or media.

One example of the use of a stepper motor to accurately and consistently position an object is disclosed in U.S. Pat. No. 5,410,338 for a Method And Apparatus For Moving An Object With Uniform Motion, issued Apr. 25, 1995 to Jadrich et al. (hereinafter referred to as "Jadrich"). Jadrich discloses an apparatus for printing an image to an object. The apparatus comprises a lead screw adapted to move the object to be printed upon and a stepper motor adapted to rotate the lead screw in a series of rotational steps wherein each step was less than that of the lead screw. Thus, Jadrich is an excellent example of a drive need that is successfully met by the use of a stepper motor. In this case, the lead screw, for each revolution, possessed a predetermined pattern of relationships between an amount of displacement of the object and each step of the stepper motor.

Another example of the use of stepper motors is provided by U.S. Pat. No. 5,852,354 for a Mutiplexing Rate Generator/Counter Circuit For Controlling Stepper Motors issued Dec. 22, 1998 to J. Randolph Andrews (hereinafter referred to as "Andrews"). In Andrews, a multiplexing circuit was provided so that up to sixteen different stepping motors could share a single rate generator.

As the stepper motor population group diversified with the myriad applications that the motor population could serve, stepper motors were modified and redefined through control of the circuits that guide the electrical impulses that drive the motors. One of the early problems that led to such modification was the determination that when the motor was running at conventional full or half-step mode, there was a significant increase in noise level and torque resonance. The answer to the problem was found in "micro-stepping" the motor.

The increase in noise and torque resonance are a byproduct of the conventional stepper motor design. Permanent magnet type stepper motors generally comprise coil windings, magnetically conductive stators and a permanent magnet rotor. An electromagnetic field having opposite poles (a north and a south pole) is created when the coil winding is energized. The magnetic field is carried by the magnetically conductive stators, thus causing the rotor to align itself with the magnetic field. The field, in turn, can be shifted by "stepping" (through sequentially energizing) the stator coils to generate a rotary motion. Various forms of stepping exist; these include: "one phase on" and "two phase on" stepping, as well as half-stepping.

Half-stepping occurs when an "off" state is inserted between transitioning phases, thus cutting the stepper motor's full step angle in half. Half stepping, however, results in a loss of torque compared to other forms of stepping such as "two phase on". The loss of torque is the result of one of the coil windings not being energized during alternate half steps, thus reducing the electromagnetic force being exerted on the rotor.

Coil windings too, can be of varied type such as "bipolar" or "unipolar" winding. In bipolar coil winding, each phase consists of a single winding. If the current flow in the windings is reversed through switching, then the electromagnetic polarity of the phase is reversed. Unipolar winding, on the other hand, consists of two windings on a common pole. The opposite poles are created when the separate windings are energized. In unipolar winding, the electromagnetic polarity from the drive to the coil windings is not reversed as is the case with bipolar windings. Unipolar windings though, produce less torque than their bipolar counterparts because the energized coil only utilizes half as much of the conductive winding (typically copper).

In addition to problems with torque in its many forms, stepper motors generate a resonant frequency as a result of their basic spring-mass configurations. When the motor's step rate equals the motor's natural frequency, there is an increase in the noise level of the motor as well as an increase in motor vibration. In addition to the increased noise burden on system users, continued vibration can weaken the system structure and efficiency.

Changing the step rate or microstepping the motor are the two most common means of reducing resonance problems. Microstepping divides a full step into smaller steps and helps reduce noise levels and produce smoother output motion in addition to reducing resonance.

The microstepping of a motor has been disclosed in the prior art with reference to the addressing of specific needs. Such a need is answered in U.S. Pat. No. 5,359,271 for a Microstepping Bipolar Stepping Motor Controller For Document Positioning issued Oct. 25, 1994 to Frederick K. Husher (hereinafter referred to as "Husher"). In Husher, one object of the invention was to provide an inexpensive controller that could drive a stepping motor in a microstep mode while yielding a multiple of defined position steps as compared to the number of physical motor poles.

Another need answered by microstepping a motor is disclosed in U.S. Pat. No. 4,710,691 for a Process And Apparatus For Characterizing And Controlling A Synchronous Motor In Microstepper Mode issued Dec. 1, 1987 to Bergstrom et al. (hereinafter referred to as "Bergstrom"). Bergstrom discloses the use of motor characterization stored in memory for use as a control of the rotational motion of the stepper motor.

The prior art, in addressing such issues as resonance and motion control, has still failed to produce a relatively simple drive system that can be easily adapted to a variety of equipment in a simple, yet efficient, way. There exists a need for a low-cost, easily replicable, micro-stepping motor in which the torque resonance and noise levels are reduced over those of prior art motors.

SUMMARY OF THE INVENTION

The invention is a method of controlling a microstepping motor while utilizing a logic circuit. The method comprises a number of steps that begin with initializing the logic circuit in accordance with the requirements of a profile/index bit generated by a microcontroller. This initialization step comprises the further steps of establishing an initial stage for the logic circuit; determining whether or not to run the motor in stand-alone mode; and, if said determination is "NO" then running the motor in pulse controlled mode. The profile/index bit representative of the mode choice is then generated.

The logic circuit's initial stage comprises the initialization of a set of one or more data registers; configuration of interrupts in accordance with the motor use profile; configuration of input/output ports in accordance with the system profile; and, the setting of timer prescales.

The method next performs a logic sequence wherein the sequence determines a motor use profile, a system profile, and a program flow. After completion of the logic sequence, the method performs a step sequence to establish the timing pattern of electrical impulses to be directed to one or more integrated circuits. A predetermined acceleration table is established in a program memory having a set of delay constants, wherein the set of delay constants contain the timing sequences for each step in the motor use profile. The acceleration table is then accessed so as to implement acceleration. The acceleration table is established for each profile and each step mode.

The logic circuit points to the acceleration table chosen by the profile/index bit and establishes a set of variables according to the step mode and direction. Further, the logic circuit performs a set of three states in the motion profile wherein two of the three states involve acceleration and wherein the remaining one of the three states involves slew.

The logic circuit returns a delay constant from the acceleration table and places a set of data relative to the delay constant in one or more registers for use by the step sequencing routine.

The step sequencing step comprises the further step of delivering a timing sequence to the integrated circuit wherein the sequence is further comprised of a set of interrupt service routines, and, wherein each one of the interrupt service routines corresponds to a state of the motion profile. Each one of the interrupt service routines reloads a timer with a next delay constant and sends the next delay constant to the integrated circuit before updating the step count.

The microcontroller in stand-alone mode will accelerate the motor then slew the motor in accordance with a preprogrammed velocity selected by the profile bit. The microcontroller decelerates the motor to a stop upon a change in the control bits, reads the changed control bits, and performs an action in accordance with the changed control bit configuration. If the mode is a pulse controlled mode, however, then the microcontroller directly correlates a motor velocity to an input pulse signal.

BRIEF DESCRIPTION OF THE DRAWINGS

FIG. 1 is a block diagram of the microcontroller of the present invention.

FIG. 4D is a continuation of the flowchart of FIG. 4C showing the control logic flow in the stand-alone mode.

DETAILED DESCRIPTION OF THE PREFERRED EMBODIMENTS

Figure 2A:
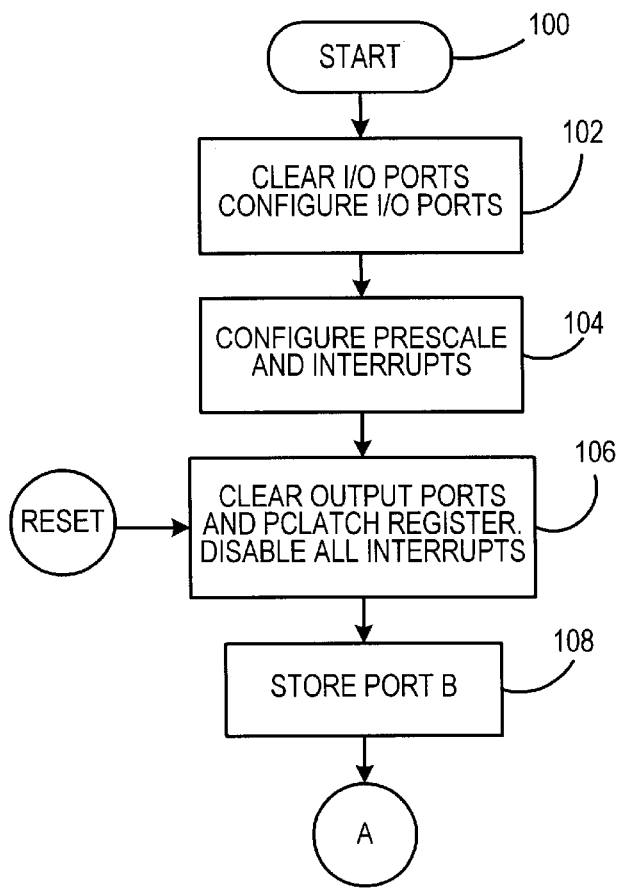
FIG. 2A is a flowchart of the initialization performed by the microcontroller at power-up.

Microstepping a motor requires a significant number of electronic circuits to generate all the necessary functions and logic. Implementing these functions and logic in software results in fewer hardware components and reduces the size of as printed circuit boards. A significant software portion of this invention is an intelligent logic and algorithm for accelerating and decelerating a motor to a desired speed without losing its synchronization. The software module takes care of all the necessary control logic such as start/stop, motion direction, 1/8th or 1/16th step selection, short-circuit detection and operation mode.

Turning to FIG. 1, there is shown a block diagram of the microcontroller utilized to control the stepper motor. The microcontroller 10 (such as the PIC16C63A which is commercially available from Microchip Technology Inc. of Chandler, Ariz.) is used to implement all the necessary logic and functions performed by the microstepping motor drive. The microcontroller 10 takes care of the interface to external devices 20 through six (6) control bits 21–26 and outputs step sequences to the mixed signal integrated circuit 30 (I.C.) (such as the A3957 which is commercially available from Allegro Microsystems Inc. of Worcester, Mass.) through ten (10) signal bits. The microcontroller 10 holds all of the required source code in its memory. It operates at 20 MHz clock speed, 200 ns per master clock period. The software module supports motor speeds up to 5000 full-step or 1500 RPM.

The microcontroller can run in two program modes. Based on the program mode selected by the Profile/Index bit 25, the microcontroller 10 will accelerate the motor then slew at the preprogrammed velocity selected by the Profile bits 25. Upon a change in control bits, the microcontroller 10 will decelerate the motor to a stop then look at the control bits to determine the next course of action. In pulse controlled (index) mode, the motor velocity is directly related to the input pulse signal. Every time the microcontroller 10 receives a pulse, it will output a step to the integrated circuit chip 30. Therefore, the system that sends the pulse signals to the microcontroller 10 would also have to take care of motor acceleration. When set, the latch input bit locks the Direction and Mode.

TABLE 1

Control Bits in Profile Mode

| Control Bit (s) | Value | Assignment |
|---|---|---|
| Start-Stop | 0 | Stop |
|  | 1 | Start |
| Mode | 0 | 1/16th Step |
|  | 1 | 1/8th Step |
| Direction | 0 | cw |
|  | 1 | ccw |
| Profile1:Profile0 | 00 | 500 Fs/sec slew velocity |
|  | 01 | 1000 Fs/sec slew velocity |
|  | 10 | 2000 Fs/sec slew velocity |
|  | 11 | 3000 Fs/sec slew velocity |

TABLE 2

Control Bits in Index Mode

| Control Bit (s) | Value | Assignment |
|---|---|---|
| Pulse | — | A rising edge tells the microcontroller to send out next step |
| Enable | 1 | Run motor |
|  | 0 | Disable motor |
| Latch | 1 | Inputs latched |
|  | 0 | Inputs not latched |
| Direction | 0 | cw |
|  | 1 | ccw |
| Mode | 0 | 1/16th step |
|  | 1 | 1/8th step |

In microstepping, the motor current slowly steps up to the peak current then slowly steps back down. If the proper step sequence is followed, the resulting current waveform should be sinusoidal. Table 3 shows the step sequence for two mode options: 1/8th step and 1/16th step. There are thirty-two (32) steps in the 1/8th step mode and sixty-four (64) steps in the 1/16th step mode. There are two (2) phases to a stepper motor. For each phase, there is a phase enable bit 32 and four D/A bits 31 resulting in a total of ten (10) bits. Since the microcontroller 10 is an 8-bit microcontroller, the ten bits are divided into a group of eight (8) bits and a group of two (2) bits. The group of eight (8) bits consists of D/A bits 31 (A0:A3 for phase A and B0:B3 for phase B). The group of two (2) bits contains the phase enable bits 32. The columns labeled 'Hex value' contain the hexadecimal equivalents to the 8-bit and 2-bit words.

Table 3

Step Sequence Table

Table 3 is attached hereto as Attachment 1 following the Detailed Description of the Preferred Embodiments.

In stand-alone mode, compilation of the acceleration table needs to be completed prior to coding the algorithm. The acceleration table is a list of delay constants that corresponds to delay times. Compilation of the acceleration table requires knowledge of the motor as well as the target velocities of the motor.

For a 1.8° step motor, 200 full steps result in one revolution of the motor. In 1/16th microsteps per full-step mode, that is equivalent to 3200 microsteps per revolution. This means that for every revolution, the microcontroller 10 needs to send out 3200 sets of 10-bit signals to the integrated circuit 30 or motor drive chips. There are 64 unique sets of these 10-bit signals and they repeat in the order specified by the step table. The velocity of a stepper motor is equal to how fast the motor steps. By controlling the time between sending out signals, the microcontroller 10 can control the velocity of the motor. For example, if the microcontroller 10 sends out one step every millisecond, then the motor will be running at 1000 microsteps/sec (equal to 1/1 ms). The time between steps the is referred to as "delay time". A table of delay times would be sufficient for an acceleration table. However, since a microcontroller deals with master clock cycles and hexadecimal numbers, the delay times must be converted into hexadecimal delay constants. The delay constant for a given delay time can be determined by the following formula:

$$\text{Delay\_Constant} = \frac{\text{Delay\_Time}}{\text{Prescale} * \text{Cycle\_Period}}$$

The cycle period is the time it takes for a microcontroller to go through one cycle (With a 20 MHz clock, the cycle period is 0.2 µs). The prescale is a factor to scale down delay constants. With a prescale of 1, a delay time of 1 ms will result in a delay constant of:

$$\text{Delay\_Constant} = 1\text{ms} = 5000$$

$$1*0.2\ \mu s$$

A delay constant of 5000 in decimal is equivalent to 1388 in hexadecimal.

Now turning to FIG. 2A, there is shown a flowchart of the initialization performed by the microcontroller 10 at power-up.

Upon power-up at step 100, the microcontroller 10 initializes several registers step 102, configures interrupts and I/O ports, and sets timer prescales at step 104. It will then determine whether to run in pulse-controlled mode or stand-alone mode.

In standalone mode, the software is divided into three sections: control logic, step sequencing, and preprocessed acceleration tables. The logic section determines which profile to run as well as the program flow. The step sequencing section handles the timing involved in sending out signals to the integrated circuit 30. To implement acceleration, delay constants that contain the timing for each step in the acceleration profile are stored in tables in the program memory. These acceleration tables (one for each profile and step mode) must be calculated by the programmer beforehand and burned into the microcontroller 10 memory.

The control logic section reads the input control bits, points to the acceleration table chosen by the profile bits, and sets variables according to the mode and direction. The profile being run depends solely on the acceleration table and certain variables. Once these variables are set to the correct values corresponding to the profile, the same algorithm will be used to run each profile. The control section will then flow through the three states in the motion profile. Two of the states involve acceleration, while the third state is slew. The outset of the acceleration tables contain 16-bit delay constants, while the remaining portion of the tables contain 8-bit delay constants. Since the microcontroller 10 is 8-bit, processing of 16-bit constants and 8-bit constants are separated. The main task in each stage is to get delay constants from the acceleration table and place the data in registers for the use of the step sequencing routines.

The step sequencing algorithm is responsible for the timing at which steps are outputted to the integrated circuit 30. This algorithm consists of interrupt service routines, one interrupt routine for each state of the motion profile. Each interrupt routine first reloads a timer with the next delay constant, then sends out the next step to the integrated circuit 30, and finally updates the step count. When the timer reaches '00', an interrupt will occur that will call the service routine again. A step table with the proper step sequence is stored in program memory. It is important that the step count is updated correctly. In indexed mode, the algorithm checks for a rising edge, then sends out a step to the integrated circuit immediately after the rising edge. There is a routine that updates the step count every time a step is sent out.

Returning to FIG. 2A, the method then advances to step 106 to clear output ports and PCLatch register before disabling all interrupts. The system then stores the configuration at port B in step 108 before advancing along path A to step 110 as is shown in FIG. 2B.

Figure 2B:
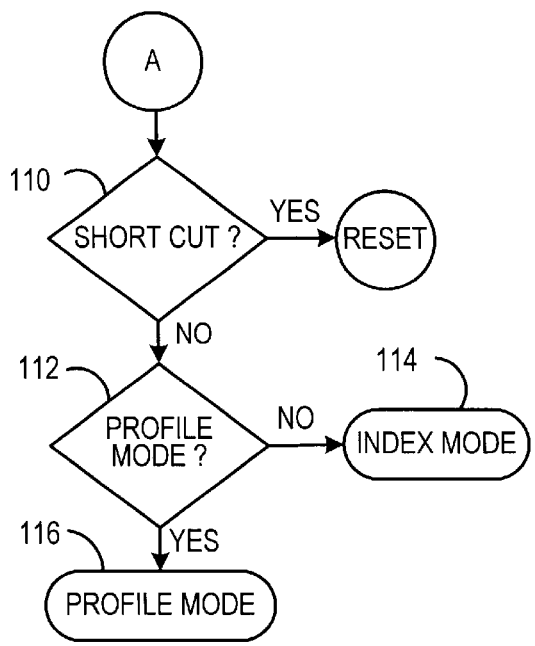
FIG. 2B is a continuation of the flowchart of FIG. 2A showing the initialization performed by the microcontroller at power-up.

FIG. 2B is a continuation of the flowchart of FIG. 2A showing the initialization performed by the microcontroller at power-up. The flow begins with a query at step 110, which asks if a short circuit is present. If the response to the query is "YES," then the Reset function is activated; if there is no Short Circuit, then the method advances to the query at step 112. Step 112 queries as to whether or not a profile mode is in place. If the Profile Mode is not in place, then the method advances to the Indexed Mode at step 114. If, however, the response to the query at step 112 is "YES,", then the method advances to step 116 and accesses the profile mode.

Figure 3A:
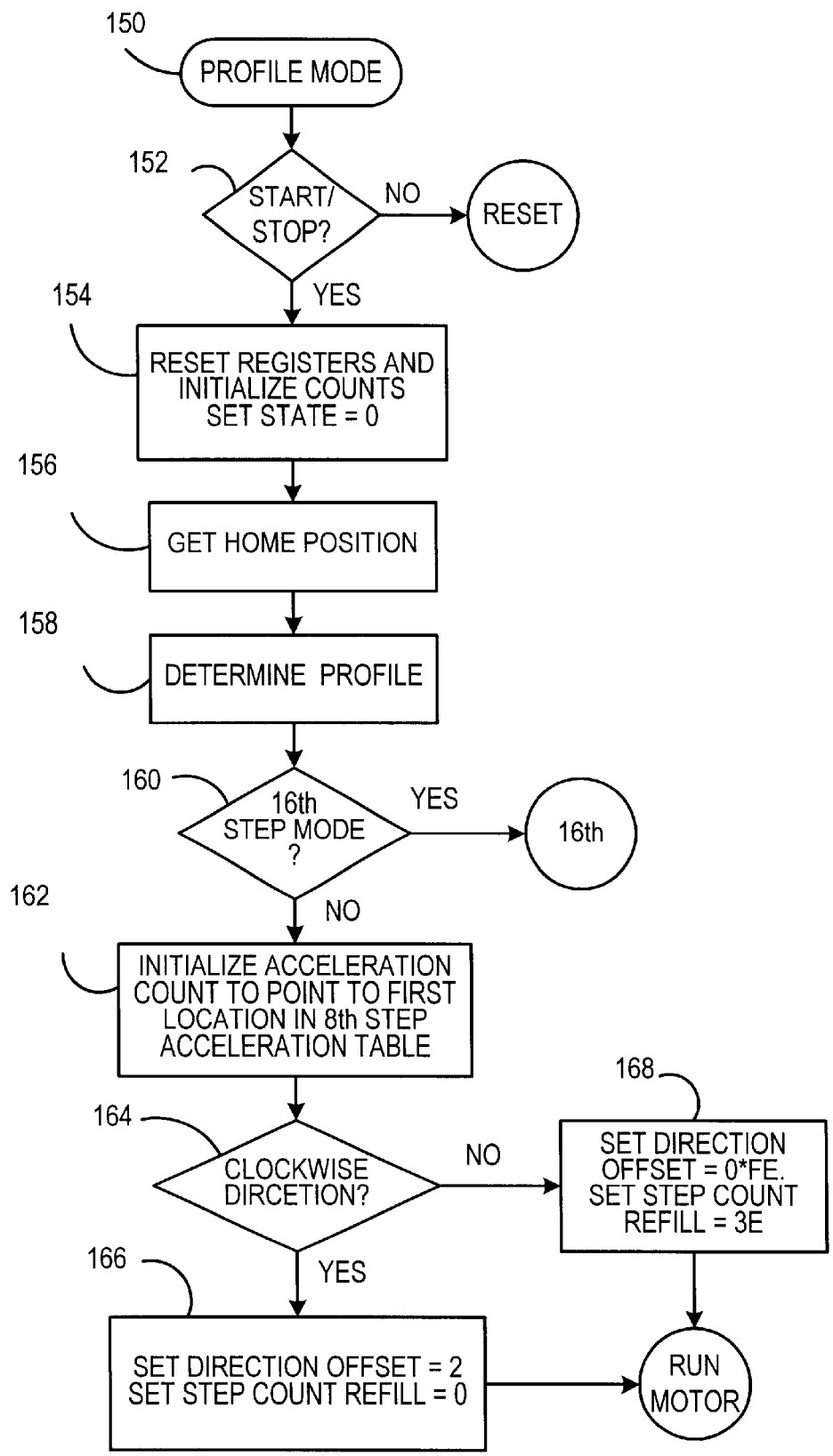
FIG. 3A is a flowchart of the control logic flow in the stand-alone mode of the logic circuit utilized to control the micro-stepping motor.

FIG. 3A is a flowchart of the control logic flow in the stand-alone mode of the logic circuit utilized to control the micro-stepping motor. Commencing with the Profile Mode at step 150, the method advances to step 152 which queries as to whether or not the motor has performed a stop/start. If the response to the query is "NO," then the Reset function is activated; if, however, the response to the query is "YES," then the data registers are reset, re-initialized and the set state is counted at step 154 before proceeding to the home position at step 156. Once the home position has been established the motor use profile is established at step 158 before advancing to the query at step 160 which asks whether or not the $16^{th}$ step mode is to be utilized. If the response to the query is "YES," then the timing sequence is set for $16^{th}$ step mode. If, however, the response to the query at step 160 is "NO,", then the method proceeds to initialize, at step 162, acceleration counter to print to the first location in the $8^{th}$ step acceleration table. The method advances from step 162 to step 164 which queries as to the motion of the motor. If proceeding in a clockwise direction, then the method advances to step 166 where the direction offset is set at 2, and the count refill is set at 0 before the motor is run. If the motor is to be set in a counterclockwise direction, then the direction offset is set at 0*FE and the step count refill is set at 3E.

Figure 3B:
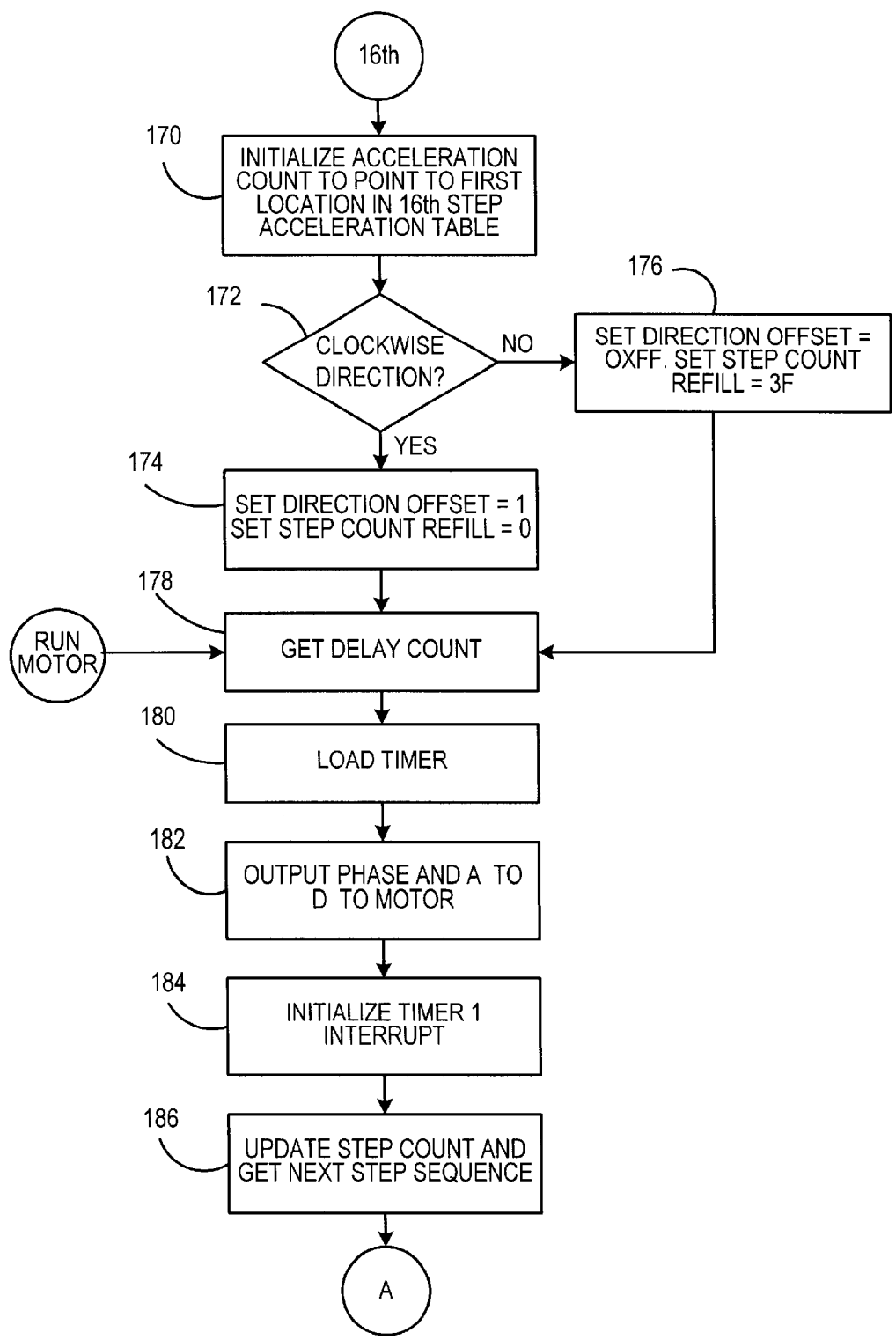
FIG. 3B is a continuation of the flowchart of FIG. 3A showing the control logic flow in the stand-alone mode.

Turning next to FIG. 3B there is shown a continuation of the flowchart of FIG. 3A showing the control logic flow in the stand-alone mode. The method proceeds in the $16^{th}$ step mode to initialize the acceleration count to point to a first location in the $16^{th}$ step acceleration table at step 170. The method advances from step 170 to step 172 where the method queries as to the rotation of the motor. If the motor is to move in a clockwise direction, then the direction offset is set at 1 and the step count refill is set at 0 in step 174 before advancing to step 178. If the motor movement is in a counterclockwise direction, then the direction offset is set at 0xFF and the step count refill is set at 3F in step 176 before advancing to step 178. At step 178, the motor is run and a delay count taken before proceeding to the timing of the load at step 180. From step 180, the method advances to step 182 where the output phase and analog to digital (A/D) signals are passed to the motor before proceeding to initialize Timer 1 and trigger the interrupt at step 184. The step count is then updated and the next sequence is sought before advancing along path A to step 190 as is shown in FIG. 3C.

Figure 3C:
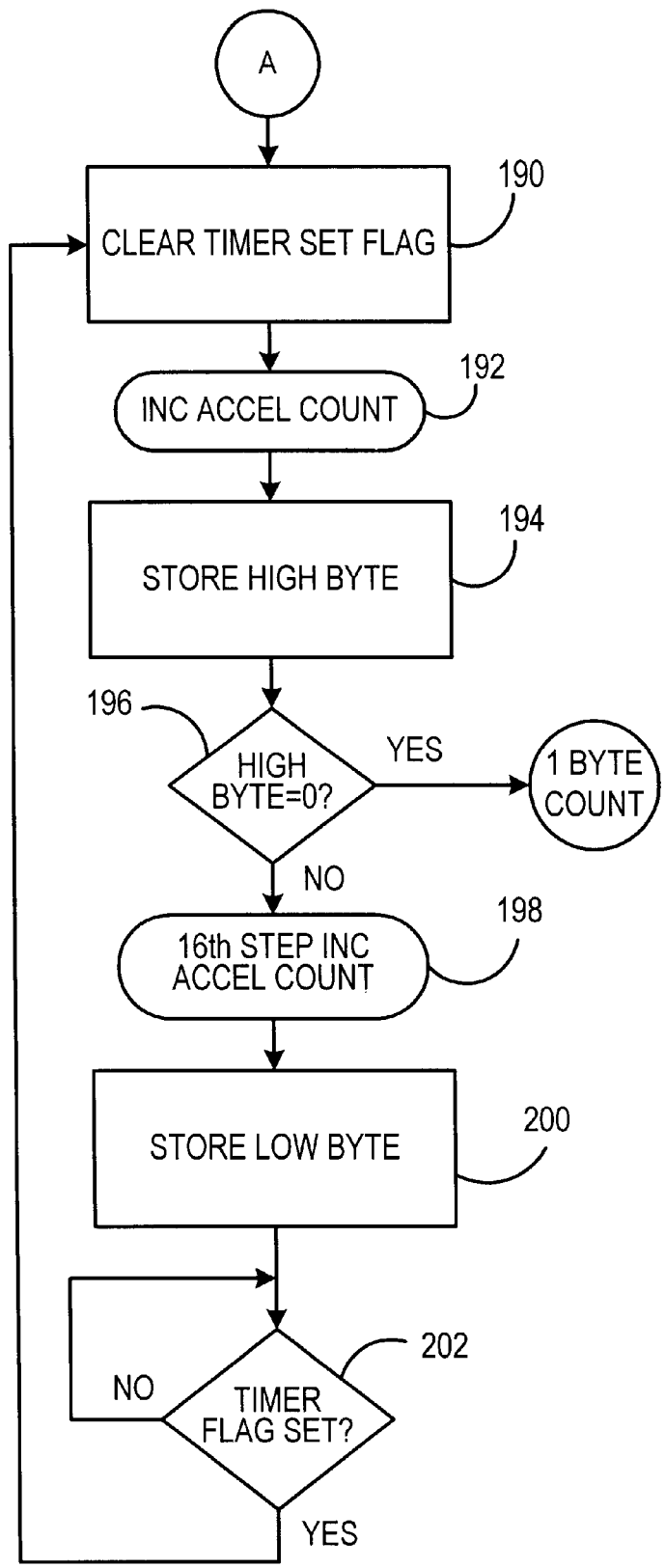
FIG. 3C is a continuation of the flowchart of FIG. 3B showing the control logic flow in the stand-alone mode.

FIG. 3C is a continuation of the flowchart of FIG. 3B showing the control logic flow in the stand-alone mode. Path A is shown re-entering the method flow at step 190 where the timer set flag is cleared before proceeding to the acceleration count at step 192. From step 192, the method advances to step 194 where the High Byte is to be stored. From step 194, the method advances to step 196 where if the High Byte is at 0, then the method proceeds to the 1 Byte Count. If High Byte is not set at 0, then the method proceeds to the $16^{th}$ Step acceleration count at step 198 before proceeding store the Low Byte at step 200. The method advances from step 200 to a query at step 202 which asks if the timer flag has been set. If it is not set, then the method re-enters the method flow at step 202 200. However, if the timer flag is set, then the method returns to clear the timer set flag at step 190.

Figure 3D:
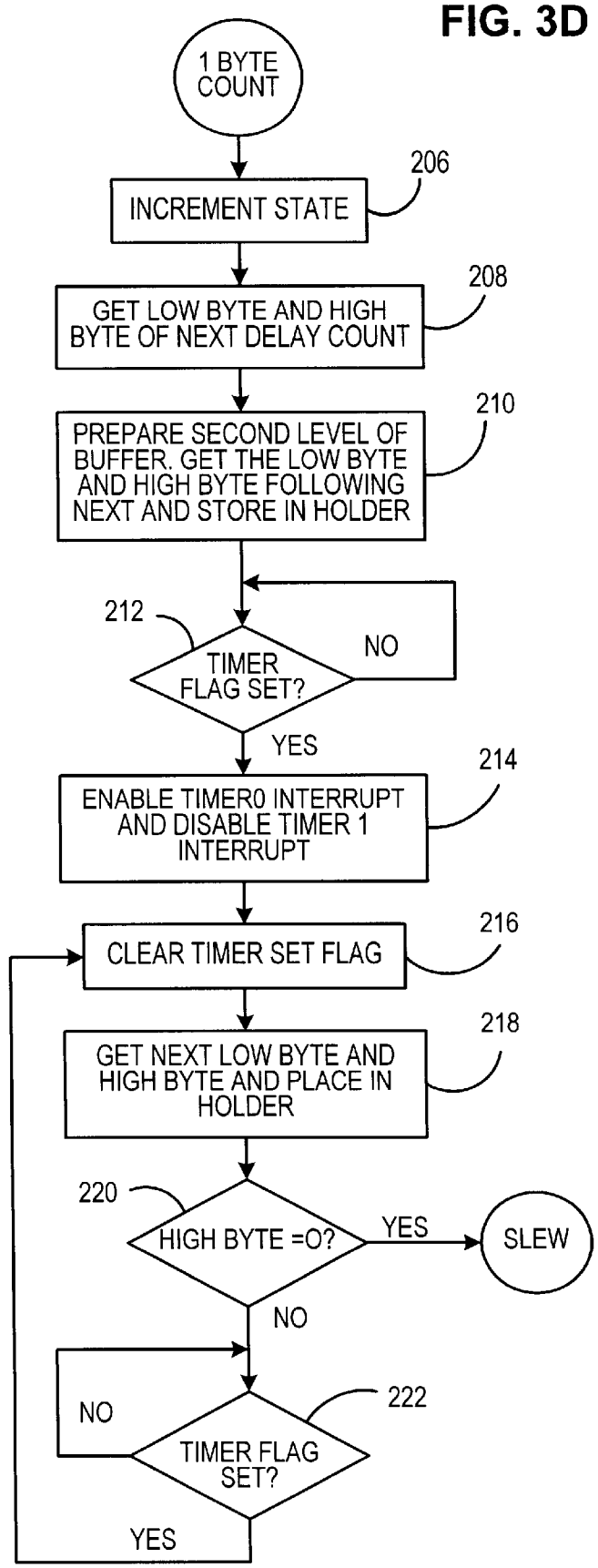
FIG. 3D is a continuation of the flowchart of FIG. 3C showing the control logic flow in the stand-alone mode.

Looking at FIG. 3D which is a continuation of the flowchart of FIG. 3C showing the control logic flow in the stand-alone mode, the method proceeds from the 1 Byte count initialization. The method proceeds to step 206 where the motion state is incremented so as to get the Low Byte and High Byte of the next delay count at step 208. From step 208, the method advances to step 210 where the second level of buffer is prepared. The Low byte and the High Byte are obtained next and stored in a data place holder. The method proceeds to step 212 to check if the timer flag has been set. If the timer flag is not set, then the flow returns to enter before step 212. If the timer flag is set, then the method proceeds to the Enable Timer0 Interrupt and Disable Timer1 Interrupt acctions at step 214.

The timer set flag is cleared at step 216 and the method advances to get the next Low Byte and High Byte and place them in the holder at step 218. If the High Byte is at 0 in step 220, then the method proceeds to SLEW. If not, then the method queries, at step 222, as to whether or not the timer flag is set. If the Timer Flag is not set, then the flow returns to step 220; if the timer flag is set, then the method returns to step 216.

Figure 4A:
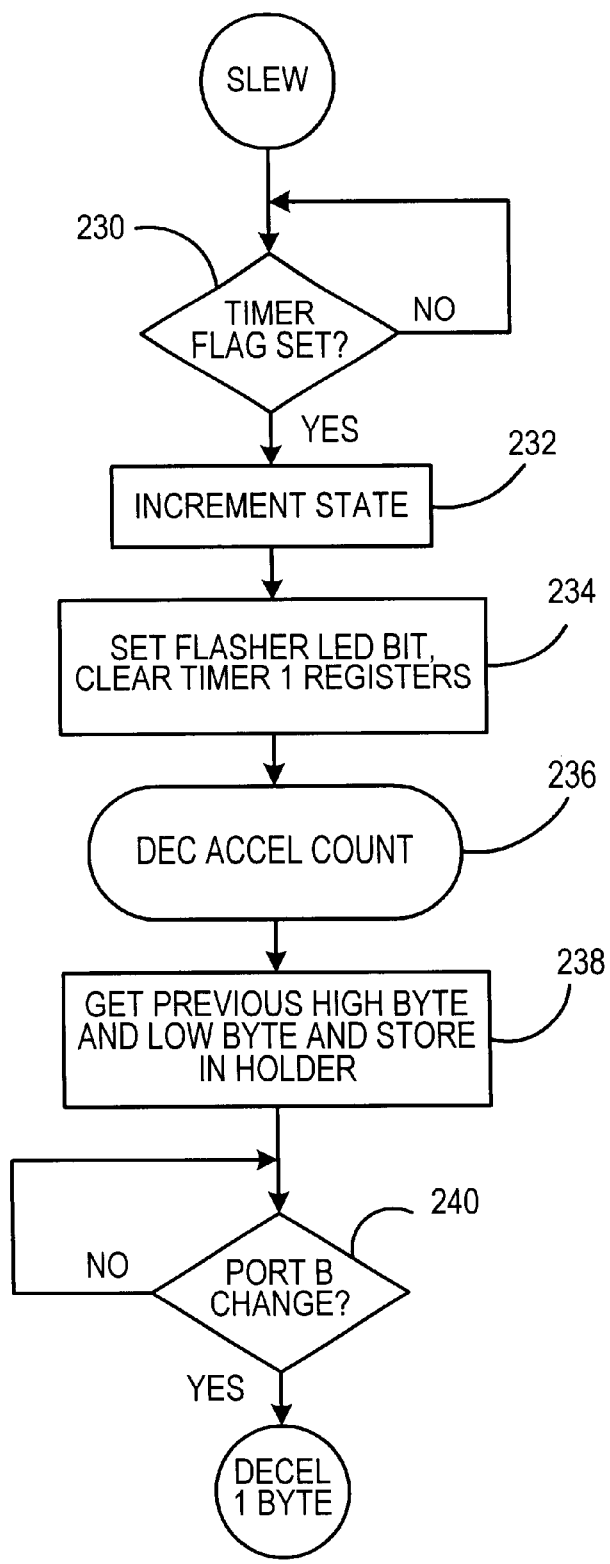
FIG. 4A is a flowchart of the control logic flow in the stand-alone mode of the logic circuit utilized to control the micro-stepping motor.

FIG. 4A is a flowchart of the control logic flow in the stand-alone mode of the logic circuit utilized to control the micro-stepping motor. The flow of FIG. 4A details the SLEW routine. From the routine opening, the method advances to step 230 which queries as to whether or not the timer flag is set. If the response to the query is "NO," then the method returns to re-enter the flow at step 230. However, if the response to the query at step 230 is "YES," then the method continues on to step 232 where the phase state of the motor is incremented. The method advances from step 232 to step 234 where the Flasher LED bit is set and timer1 registers are cleared. At step 236 the acceleration count is decremented and the previous High Byte and the Low Byte are obtained at step 238 and stored in their place holder. If there is no PORTB change for step 240, then the method returns to the method flow at step 240, if there is a change in PORTB, then deceleration of 1 Byte occurs as is shown in FIG. 4B.

Figure 4B:
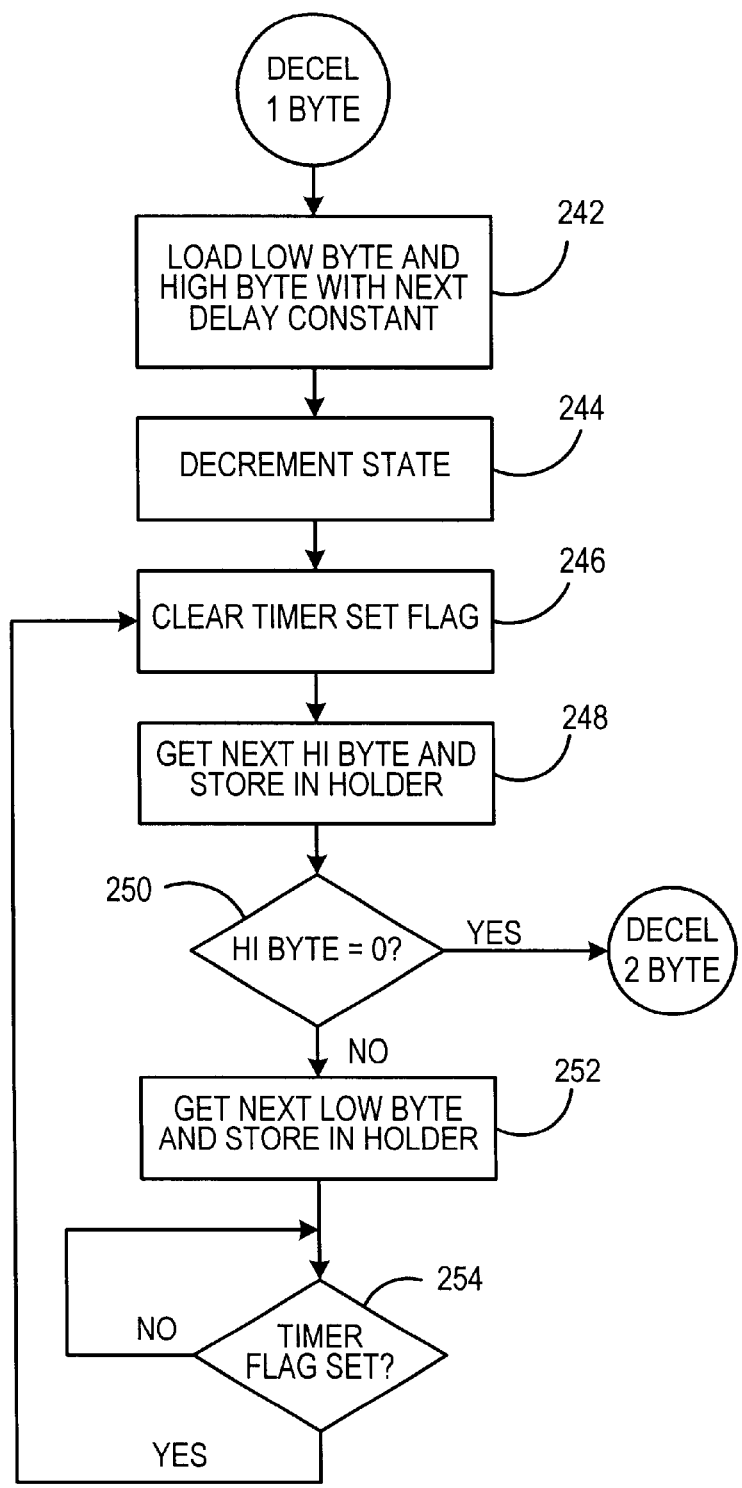
FIG. 4B is a continuation of the flowchart of FIG. 4A showing the control logic flow in the stand-alone mode.
Figure 4C:
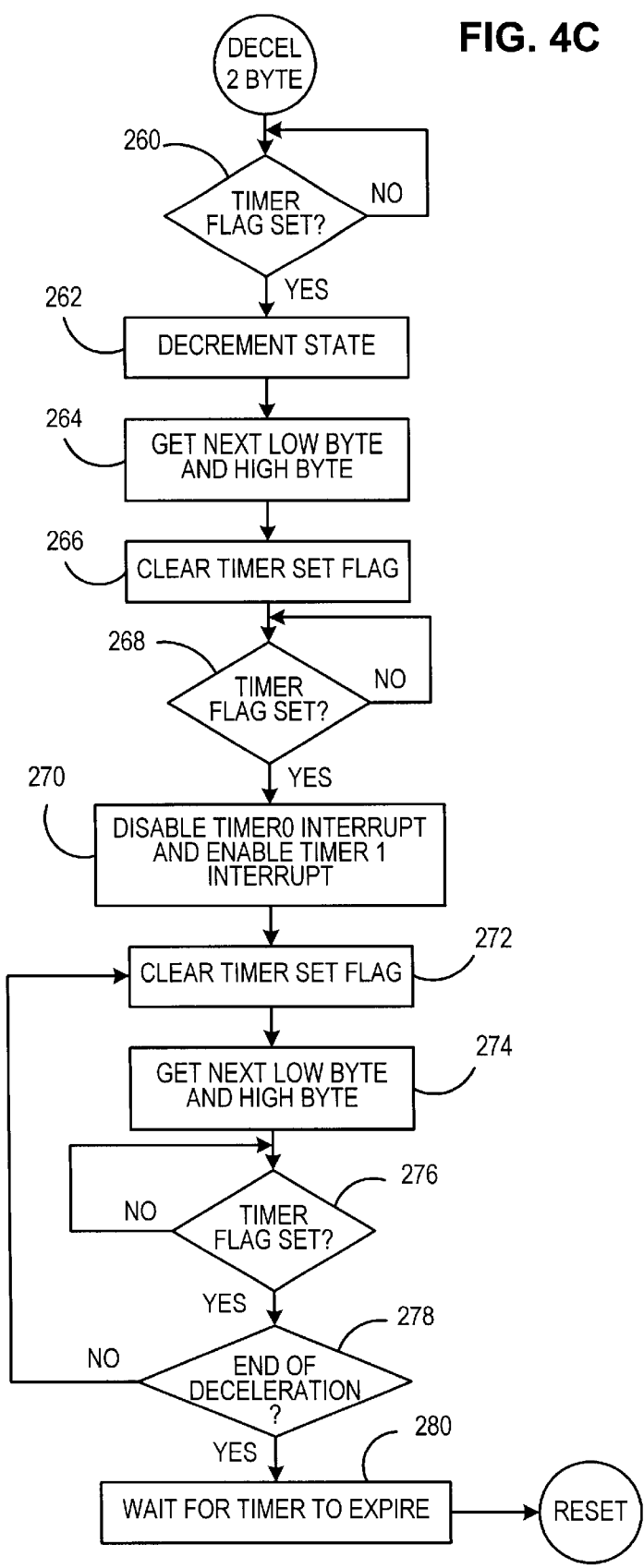
FIG. 4C is a continuation of the flowchart of FIG. 4B showing the control logic flow in the stand-alone mode.

Turning to FIG. 4B which is a continuation of the flowchart of FIG. 4A showing the control logic flow in the stand-alone mode, from the Decel 1 Byte step, the method proceeds to load the Low Byte and the High Byte with the next delay constant at step 242 before the state is decremented at step 244. The method then advances to step 246 where the timer set flag is cleared and the next High Byte is obtained and stored in the appropriate place holder at step 248. If the High byte is at 0, then the decel 2 Byte routine will be employed as is shown in FIG. 4C; if the High Byte is not at 0, then the next Low Byte is obtained at step 252 and stored in the holder before the method proceeds to check the timer flag at step 254. If the timer flag is not set, then the flow returns at step 254; if the timer flag is set, then the method returns to step 246.

Turning to FIG. 4C which is a continuation of the flowchart of FIG. 4B showing the control logic flow in the stand-alone mode and the decel 2 Byte routine in particular. If the timer flag is not set at step 260, then the flow re-enters the path at step 260; if the timer flag is set, then the method continues to decrement the state at step 262 before advancing to get the next Low Byte and high byte at step 264. The timer set flag is cleared at step 266. The timer flag is checked at step 268; and, if it is not set, then the flow returns to re-enter at step 268. If the flag is set, then disable the Timer0 interrupt and Enable Timer1 interrupt at step 270, the the timer set flag is cleared at step 272 and the next Low Byte and High Byte are obtained at step 274. Once again, the the timer flag is checked at step 276; and, if it is not set, the flow returns to step 274; if the flag is set, then the method proceeds to a deceleration query at step 278. If the response to the query is "NO," then the timer set lag is cleared at step 272; however, if the response to the query is "YES," then the method waits for the Timer to expire at step 280 prior to reset 280.

FIG. 4D is a continuation of the flowchart of FIG. 4C showing the control logic flow in the stand-alone mode. The flow begins at step 290 where the acceleration count is incremented. The method completes the incrementation at step 292. The method then advances to step 294 where the method queries as to the presence of any overflow before advancing to step 296 where an increment of the acceleration count occurs. The delay count is obtained at step 298 before proceeding to the return at step 300.

Decrementation of the acceleration count occurs at step 306. The method completes the incrementation at step 308. The method then advances to step 310 where the method queries as to the presence of any overflow before advancing to step 312 where an decrement of the acceleration count occurs. The delay count is obtained at step 314 before proceeding to the return at step 300.

Figure 5A:
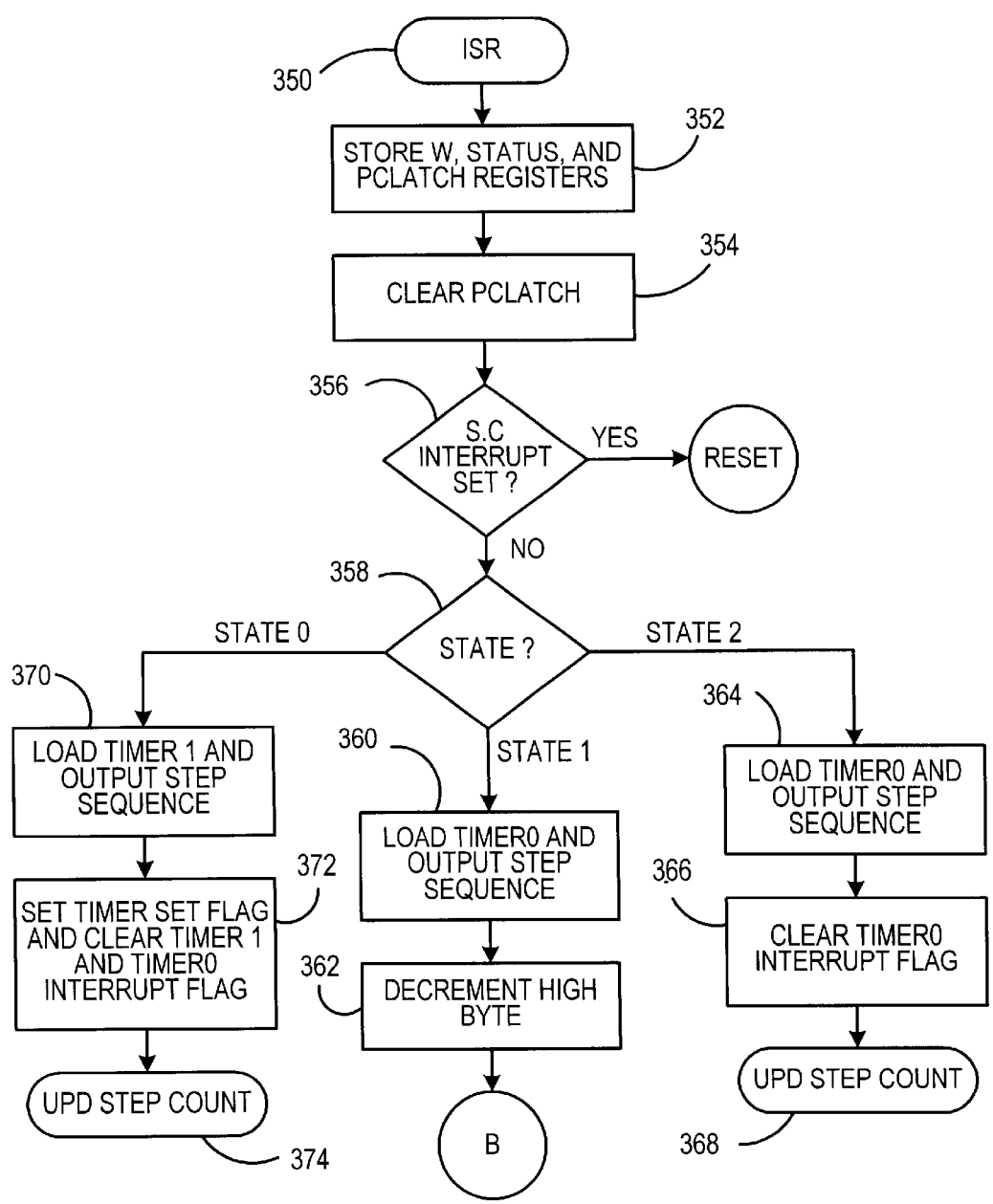
FIG. 5A is a flowchart of the step sequencing in the stand-alone mode of the logic circuit utilized to control the micro-stepping motor.

Now turning to FIG. 5A, there is shown a flowchart of the step sequencing in the stand-alone mode of the logic circuit utilized to control the micro-stepping motor at ISR step 350. The process proceeds to Store w., Status, and PCLATCH registers at step 352, then to clear PCLATCH at step 354. At step 356, there is a query as to whether S.C Interrupt Set. If the answer to the query at step 356 is "Yes", the process proceeds to Reset. If the answer to the query at step 356 is "No", the process goes to step 358 to a query to State 0, State 1 or State 2. If the answer to the query at step 356 is State 0, the process proceeds to Load Timer1 and Output Step Sequence at step 370, and then to Set timer Set Flag and Clear timer1 and Timer0 Interrupt flag at step 372, and then to Upd Step Count at step 374. If the answer to the query at step 358 is State 1, the process goes to Load timer) and Output Step Sequence at step 360, and then to Decrement High Byte at step 362 and then to B. If the answer to the query at step 358 is State 2, the process proceeds to Load timer0 and Output step Sequence at step 364, then to Clear timer0 Interrupt Flag at step 366, and then to Upd Step Count at step 368.

Figure 5B:
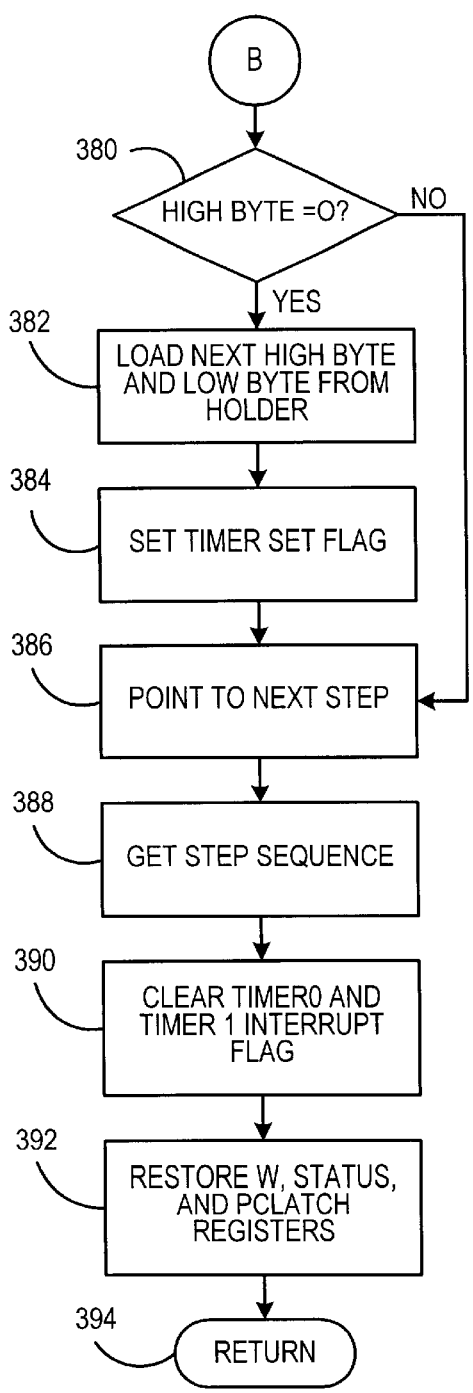
FIG. 5B is a continuation of the flowchart of FIG. 5A showing the step sequencing in the stand-alone mode.

Now turning to FIG. 5B, there is shown a continuation of the flowchart of FIG. 5A showing the step sequencing in the stand-alone mode from B following step 362 as shown in FIG. 5A. From B, the process proceeds to the query High Byte=0? at step 380. If the answer to the query at step 380 is "Yes", the process proceeds to Load Next High Byte and Low byte from Holder at Step 382, then to Set Timer Set Flag at step 384, then to Point to next step at step 386. If the answer to the query at step 380 is "No", the process proceeds to Point to next step at step 386. Proceeding from step 386, the process continues to Get Step Sequence at step 388, then Clear timer0 and timer1 Interrupt Flag at step 390. From step 390, the process continues to Restore W, Status, and PCLATCH registers at step 392 then to Return at step 394.

Figure 5C:
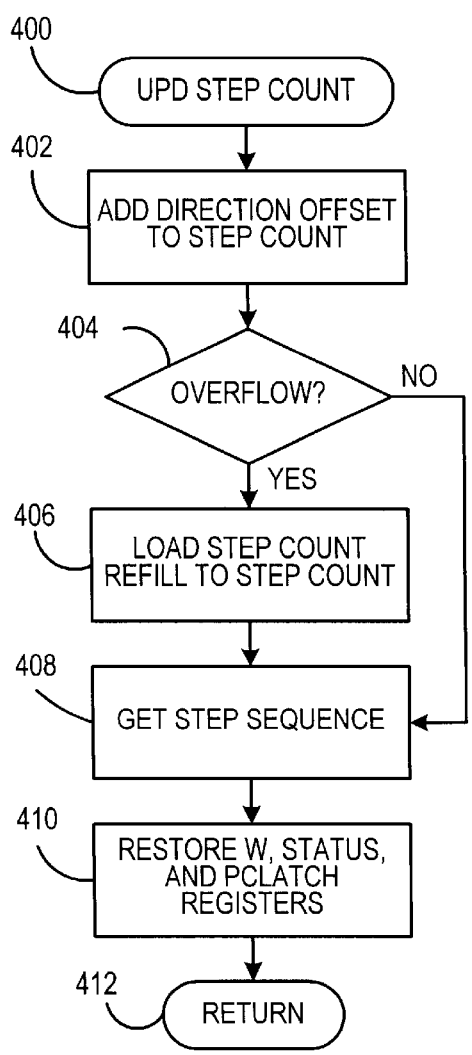
FIG. 5C is a continuation of the flowchart of FIG. 5B showing the step sequencing in the stand-alone mode.

Now turning to FIG. 5C, there is shown a continuation of the flowchart of FIG. 5B showing the step sequencing in the stand-alone mode. From Upd Step Count 400, the process proceeds to Add Direction Offset to Step Count 402. At step 404, there is a query as to whether there is an overflow. If the answer to the query at step 404 is "Yes", the process proceeds to Load step Count Refill to Step Count 406, and then to Get Step Sequence 408, then to Restore W. Status, and PCLATCH registers 410 and then to Return 412. If the answer to the query at step 404 is "No", the process proceeds to Get Step Sequence 408, then to Restore W. Status, and PCLATCH registers 410 and then to Return 412.

Figure 6A:
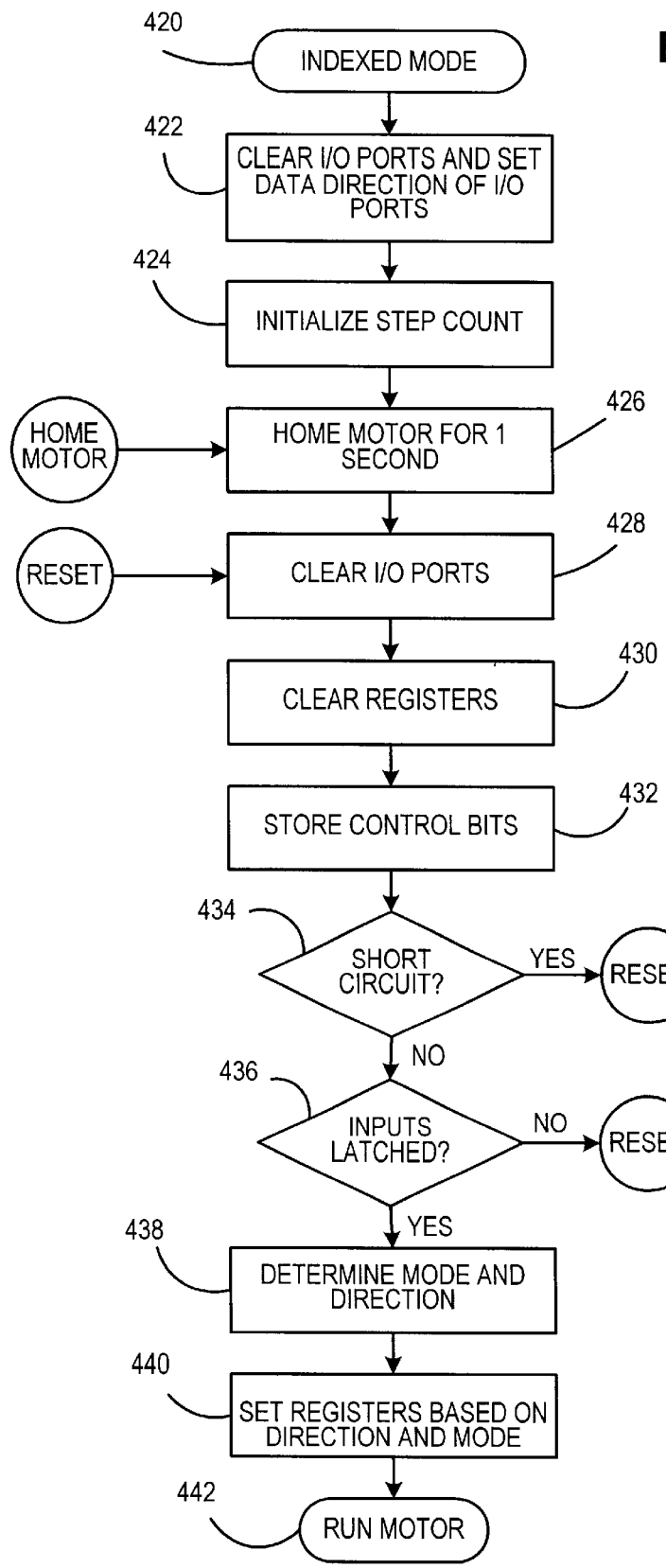
FIG. 6A is a flowchart of the indexed mode of the logic circuit utilized to control the micro-stepping motor.

Turning now to FIG. 6A, there is shown a flowchart of the indexed mode of the logic circuit utilized to control the micro-stepping motor at indexed mode 420. The process proceeds to Clear I/O ports and set data direction of I/O ports 422 and then to Initialize Step Count 424. Then the process proceeds to Home Motor for 1 second 426, and then to Clear I/O ports 428. From step 428, the process proceeds to clear registers 420 and then to Store control bits 432. At step 434, there is a query as to whether there is a short circuit. If the answer to the query at step 434 is "Yes", the process proceeds to Reset. If the answer to the query at step 434 is "No", the process proceeds to step 436 to a query as to whether the inputs latched. If the answer to the query at step 436 is "No", the process proceeds to Reset. If the answer to the query at step 436 is "Yes", the process proceeds to determine Mode and Direction 438, then to Set registers based on direction and mode 440, and then to Run Motor 442.

Figure 6B:
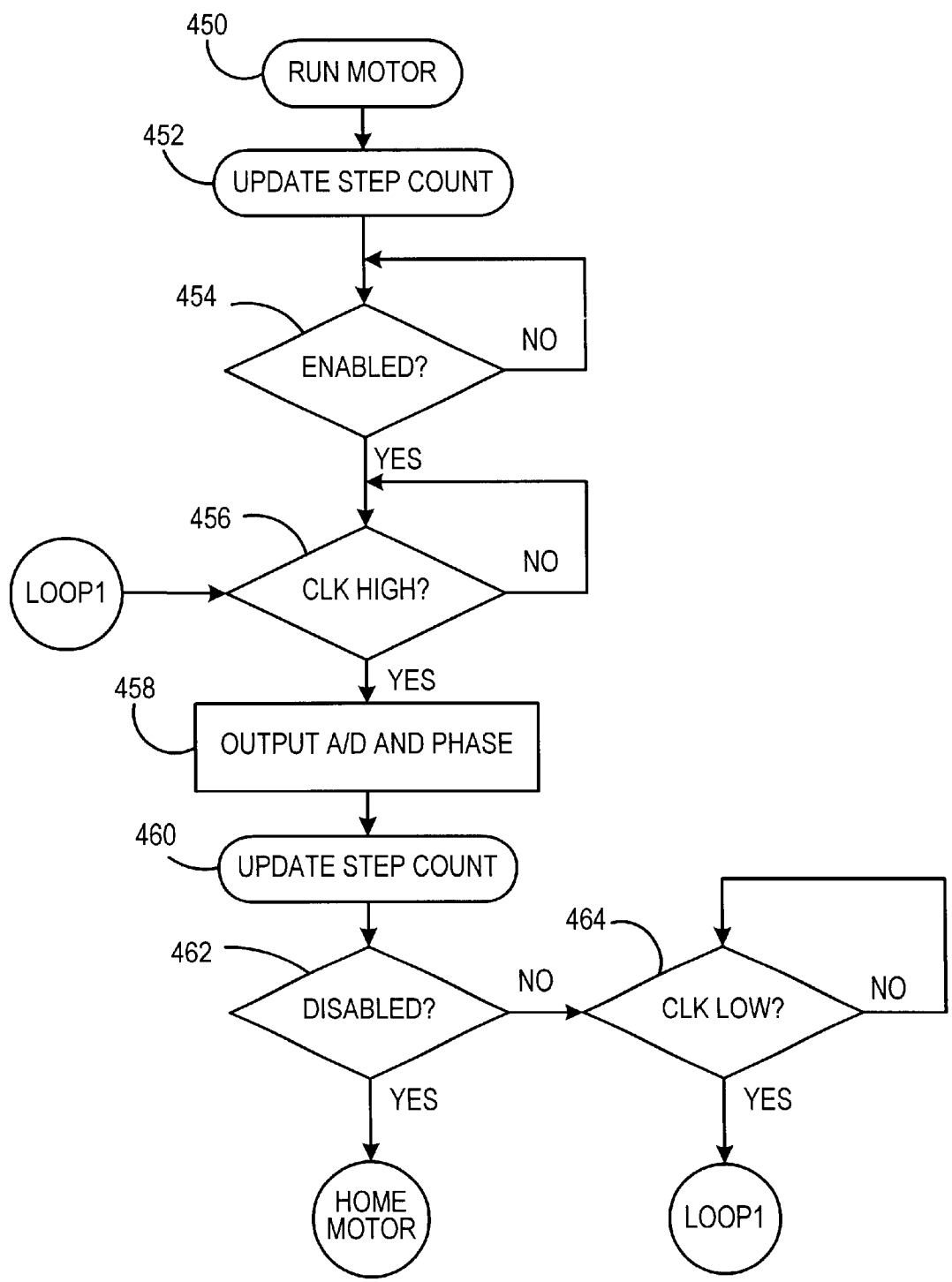
FIG. 6B is a continuation of the flowchart of FIG. 6A showing the indexed mode of the logic circuit.

Now turning to FIG. 6B, there is shown a continuation of the flowchart of FIG. 6A showing the indexed mode of the of the logic circuit beginning at Run Motor 450, and continuing to Update Step County 452. At step 454, if the update step count is enabled, the process proceeds to step 456. If, at step 454, the update step count is not enabled, the process returns to step 452.

If the process is enabled at step 454 and proceeds to step 456, the process is queried as to whether to close High. If the answer to the query is "Yes", then the process proceeds to output A/D and Phase step 458. If the answer to the query at step 456 is "no", then the process returns to step 452. Continuing from output A/D and phase step 458, the process proceeds to update step count 460 and then to step 462 where it is queried as to whether the motor is disabled. If the answer to the query at step 462 is "Yes", the process proceeds to Home Motor. If the answer to the query at step 462 is "No", the process proceeds to step 464 where it is queried as to whether the clk low. If the answer to the query at step 464 is "Yes", the process proceeds to Loop1. If the answer to the query at step 464 is "No", the process terminates.

Figure 6C:
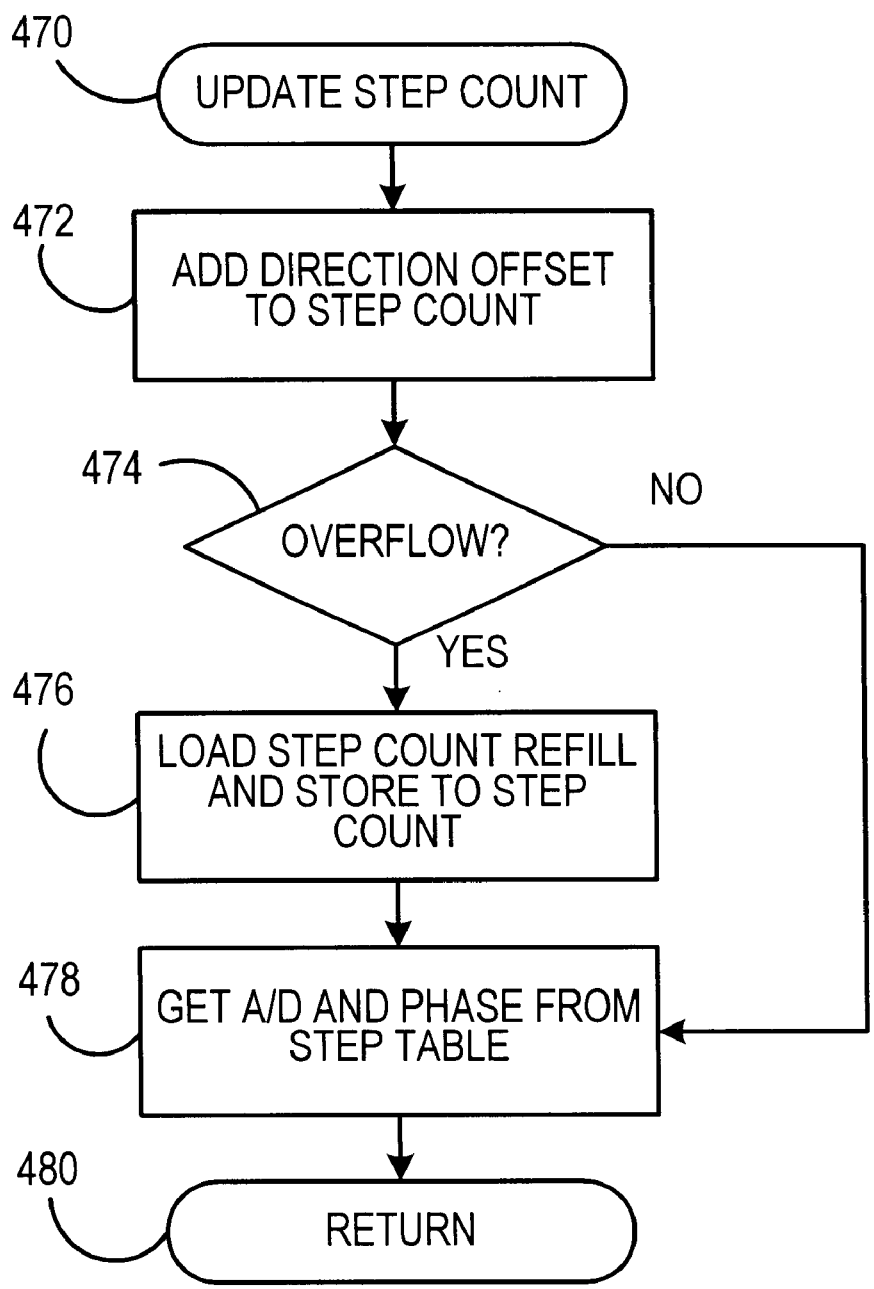
FIG. 6C is a continuation of the flowchart of FIG. 6B showing the indexed mode of the logic circuit.

Now turning to FIG. 6C, there is shown a continuation of the flowchart of FIG. 6B showing the indexed mode of the logic circuit. From the Update Step Count 470, the process proceeds to Add DIRECTION OFFSET to STEP COUNT 474. At Overflow 474, the process queries if there is an overflow. If the answer to the query at Overflow 474 is "Yes", the process proceeds to Load SET COUNT REFILL and store to STEP COUNT 476 and then to Get A/D and Phase from Step Table 478 and ends at Return 480. If the answer to the query at Overflow 474 is "No", the process goes to Get A/D and Phase from Step Table 478 and ends at Return 480.

While certain embodiments have been described above in terms of the system within which the method may reside, the invention is not limited to such a context.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

TABLE 3

Step Sequence Table

| Step | | | | | | | | | | Hex | | | Hex |
|---|---|---|---|---|---|---|---|---|---|---|---|---|---|
| 1/8 | 1/16 | A3 | A2 | A1 | A0 | B3 | B2 | B1 | B0 | value | Phase A | Phase B | value |
| 1 | 1 | 1 | 1 | 1 | 1 | 0 | 0 | 0 | 0 | F0 | 1 | X | 03 |
|   | 2 | 1 | 1 | 1 | 1 | 0 | 0 | 1 | 0 | F2 | 1 | 1 | 03 |
| 2 | 3 | 1 | 1 | 1 | 1 | 0 | 0 | 1 | 1 | F3 | 1 | 1 | 03 |
|   | 4 | 1 | 1 | 1 | 0 | 0 | 1 | 0 | 0 | E4 | 1 | 1 | 03 |
| 3 | 5 | 1 | 1 | 0 | 1 | 0 | 1 | 0 | 1 | D5 | 1 | 1 | 03 |
|   | 6 | 1 | 1 | 0 | 0 | 0 | 1 | 1 | 0 | C6 | 1 | 1 | 03 |
| 4 | 7 | 1 | 0 | 1 | 1 | 0 | 1 | 1 | 1 | B7 | 1 | 1 | 03 |
|   | 8 | 1 | 0 | 1 | 0 | 1 | 0 | 0 | 0 | A8 | 1 | 1 | 03 |
| 5 | 9 | 1 | 0 | 0 | 1 | 1 | 0 | 0 | 1 | 99 | 1 | 1 | 03 |
|   | 10 | 1 | 0 | 0 | 0 | 1 | 0 | 1 | 0 | 8A | 1 | 1 | 03 |
| 6 | 11 | 0 | 1 | 1 | 1 | 1 | 0 | 1 | 1 | 7B | 1 | 1 | 03 |
|   | 12 | 0 | 1 | 1 | 0 | 1 | 1 | 0 | 0 | 6C | 1 | 1 | 03 |
| 7 | 13 | 0 | 1 | 0 | 1 | 1 | 1 | 0 | 1 | 5D | 1 | 1 | 03 |
|   | 14 | 0 | 1 | 0 | 0 | 1 | 1 | 1 | 0 | 4E | 1 | 1 | 03 |
| 8 | 15 | 0 | 0 | 1 | 1 | 1 | 1 | 1 | 1 | 3F | 1 | 1 | 03 |
|   | 16 | 0 | 0 | 1 | 0 | 1 | 1 | 1 | 1 | 2F | 1 | 1 | 03 |
| 9 | 17 | 0 | 0 | 0 | 0 | 1 | 1 | 1 | 1 | 0F | X | 1 | 01 |
|   | 18 | 0 | 0 | 1 | 0 | 1 | 1 | 1 | 1 | 2F | 0 | 1 | 01 |
| 10 | 19 | 0 | 0 | 1 | 1 | 1 | 1 | 1 | 1 | 3F | 0 | 1 | 01 |
|   | 20 | 0 | 1 | 0 | 0 | 1 | 1 | 1 | 0 | 4E | 0 | 1 | 01 |
| 11 | 21 | 0 | 1 | 0 | 1 | 1 | 1 | 0 | 1 | 5D | 0 | 1 | 01 |
|   | 22 | 0 | 1 | 1 | 0 | 1 | 1 | 0 | 0 | 6C | 0 | 1 | 01 |
| 12 | 23 | 0 | 1 | 1 | 1 | 1 | 0 | 1 | 1 | 7B | 0 | 1 | 01 |
|   | 24 | 1 | 0 | 0 | 0 | 1 | 0 | 1 | 0 | 8A | 0 | 1 | 01 |
| 13 | 25 | 1 | 0 | 0 | 1 | 1 | 0 | 0 | 1 | 99 | 0 | 1 | 01 |
|   | 26 | 1 | 0 | 1 | 0 | 1 | 0 | 0 | 0 | A8 | 0 | 1 | 01 |
| 14 | 27 | 1 | 0 | 1 | 1 | 0 | 1 | 1 | 1 | B7 | 0 | 1 | 01 |
|   | 28 | 1 | 1 | 0 | 0 | 0 | 1 | 1 | 0 | C6 | 0 | 1 | 01 |
| 15 | 29 | 1 | 1 | 0 | 1 | 0 | 1 | 0 | 1 | D5 | 0 | 1 | 01 |
|   | 30 | 1 | 1 | 1 | 0 | 0 | 1 | 0 | 0 | E4 | 0 | 1 | 01 |
| 16 | 31 | 1 | 1 | 1 | 1 | 0 | 0 | 1 | 1 | F3 | 0 | 1 | 01 |
|   | 32 | 1 | 1 | 1 | 1 | 0 | 0 | 1 | 0 | F2 | 0 | 1 | 01 |
| 17 | 33 | 1 | 1 | 1 | 1 | 0 | 0 | 0 | 0 | F0 | 0 | X | 00 |
|   | 34 | 1 | 1 | 1 | 1 | 0 | 0 | 1 | 0 | F2 | 0 | 0 | 00 |
| 18 | 35 | 1 | 1 | 1 | 1 | 0 | 0 | 1 | 1 | F3 | 0 | 0 | 00 |
|   | 36 | 1 | 1 | 1 | 0 | 0 | 1 | 0 | 0 | E4 | 0 | 0 | 00 |
| 19 | 37 | 1 | 1 | 0 | 1 | 0 | 1 | 0 | 1 | D5 | 0 | 0 | 00 |
|   | 38 | 1 | 1 | 0 | 0 | 0 | 1 | 1 | 0 | C6 | 0 | 0 | 00 |
| 20 | 39 | 1 | 0 | 1 | 1 | 0 | 1 | 1 | 1 | B7 | 0 | 0 | 00 |
|   | 40 | 1 | 0 | 1 | 0 | 1 | 0 | 0 | 0 | A8 | 0 | 0 | 00 |
| 21 | 41 | 1 | 0 | 0 | 1 | 1 | 0 | 0 | 1 | 99 | 0 | 0 | 00 |
|   | 42 | 1 | 0 | 0 | 0 | 1 | 0 | 1 | 0 | 8A | 0 | 0 | 00 |
| 22 | 43 | 0 | 1 | 1 | 1 | 1 | 0 | 1 | 1 | 7B | 0 | 0 | 00 |
|   | 44 | 0 | 1 | 1 | 0 | 1 | 1 | 0 | 0 | 6C | 0 | 0 | 00 |
| 23 | 45 | 0 | 1 | 0 | 1 | 1 | 1 | 0 | 1 | 5D | 0 | 0 | 00 |
|   | 46 | 0 | 1 | 0 | 0 | 1 | 1 | 1 | 0 | 4E | 0 | 0 | 00 |
| 24 | 47 | 0 | 0 | 1 | 1 | 1 | 1 | 1 | 1 | 3F | 0 | 0 | 00 |
|   | 48 | 0 | 0 | 1 | 0 | 1 | 1 | 1 | 1 | 2F | 0 | 0 | 00 |
| 25 | 49 | 0 | 0 | 0 | 0 | 1 | 1 | 1 | 1 | 0F | X | 0 | 02 |
|   | 50 | 0 | 0 | 1 | 0 | 1 | 1 | 1 | 1 | 2F | 1 | 0 | 02 |
| 26 | 51 | 0 | 0 | 1 | 1 | 1 | 1 | 1 | 1 | 3F | 1 | 0 | 02 |
|   | 52 | 0 | 1 | 0 | 0 | 1 | 1 | 1 | 0 | 4E | 1 | 0 | 02 |

TABLE 3-continued

Step Sequence Table

| Step 1/8 | Step 1/16 | A3 | A2 | A1 | A0 | B3 | B2 | B1 | B0 | Hex value | Phase A | Phase B | Hex value |
|---|---|---|---|---|---|---|---|---|---|---|---|---|---|
| 27 | 53 | 0 | 1 | 0 | 1 | 1 | 1 | 0 | 1 | 5D | 1 | 0 | 02 |
|  | 54 | 0 | 1 | 1 | 0 | 1 | 1 | 0 | 0 | 6C | 1 | 0 | 02 |
| 28 | 55 | 0 | 1 | 1 | 1 | 1 | 0 | 1 | 1 | 7B | 1 | 0 | 02 |
|  | 56 | 1 | 0 | 0 | 0 | 1 | 0 | 1 | 0 | 8A | 1 | 0 | 02 |
| 29 | 57 | 1 | 0 | 0 | 1 | 1 | 0 | 0 | 1 | 99 | 1 | 0 | 02 |
|  | 58 | 1 | 0 | 1 | 0 | 1 | 0 | 0 | 0 | A8 | 1 | 0 | 02 |
| 30 | 59 | 1 | 0 | 1 | 1 | 0 | 1 | 1 | 1 | B7 | 1 | 0 | 02 |
|  | 60 | 1 | 1 | 0 | 0 | 0 | 1 | 1 | 0 | C6 | 1 | 0 | 02 |
| 31 | 61 | 1 | 1 | 0 | 1 | 0 | 1 | 0 | 1 | D5 | 1 | 0 | 02 |
|  | 62 | 1 | 1 | 1 | 0 | 0 | 1 | 0 | 0 | E4 | 1 | 0 | 02 |
| 32 | 63 | 1 | 1 | 1 | 1 | 0 | 0 | 1 | 1 | F3 | 1 | 0 | 02 |
|  | 64 | 1 | 1 | 1 | 1 | 0 | 0 | 1 | 0 | F2 | 1 | 0 | 02 |

What is claimed is:

1. A method of controlling a microstepping motor utilizing a logic circuit, said method comprising the steps of:
   (a) initializing said logic circuit in accordance with the requirements of a profile/index bit generated by a microcontroller;
   (b) performing a logic sequence wherein said sequence determines a motor use profile, a system profile, and a program flow;
   (c) performing a step sequence to establish the timing pattern of electrical impulses to be directed to one or more integrated circuits;
   (d) establishing, in a program memory, a predetermined acceleration table having a set of delay constants, wherein said set of delay constants contain the timing sequences for each step in said motor use profile; and
   (e) accessing said acceleration table so as to implement acceleration.

2. The method of claim 1, wherein said initializing step comprises the further steps of:
   (a) establishing an initial stage for said logic circuit;
   (b) determining whether or not to run said motor in stand-alone mode; and, if said determination is "NO" then running said motor in pulse controlled mode; and
   (c) generating a profile/index bit representative of said mode choice.

3. The method of claim 2, wherein said initial stage comprises:
   (a) initialization of a set of one or more data registers;
   (b) configuration of interrupts in accordance with said motor use profile;
   (c) configuration of input/output ports in accordance with said system profile; and
   (d) setting of timer prescales.

4. The method of claim 2, wherein said microcontroller in said stand-alone mode will accelerate said motor then slew said motor in accordance with a preprogrammed velocity selected by said profile/index bit.

5. The method of claim 2, wherein said microcontroller decelerates said motor to a stop upon a change in the profile/index bits, reads said changed profile/index bits, and performs an action in accordance with said changed profile/index bits.

6. The method of claim 2, wherein if said mode is a pulse controlled mode then directly correlating a motor velocity to an input pulse signal.

7. The method of claim 1, wherein said acceleration table is established for each profile and each step mode.

8. The method of claim 7, wherein said logic circuit points to said acceleration table chosen by said profile/index bit and wherein said logic circuit establishes a set of variables according to said step mode and direction.

9. The method of claim 8, wherein said logic circuit performs a set of three states in said motor use profile and wherein two of said three states involve acceleration and wherein the remaining one of said three states involves slew.

10. The method of claim 1, wherein said logic circuit returns a delay constant from said acceleration table and places a set of data relative to said delay constant in one or more registers for use by a step sequencing routine.

11. The method of claim 1, wherein performing a step sequence comprises the further step of delivering a timing sequence to said integrated circuit wherein said sequence is further comprised of a set of interrupt service routines wherein each one of said interrupt service routines corresponds to a state of said motor use profile.

12. The method of claim 11, wherein each one of said interrupt service routines reloads a timer with a next delay constant and sends said next delay constant to said integrated circuit and then updates a step count.

* * * * *